(12) United States Patent
Oohira et al.

(10) Patent No.: US 12,190,843 B2
(45) Date of Patent: Jan. 7, 2025

(54) DISPLAY DEVICE

(71) Applicant: Japan Display Inc., Tokyo (JP)

(72) Inventors: Tomohide Oohira, Tokyo (JP); Yasuhiko Yamagishi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 245 days.

(21) Appl. No.: 17/859,011

(22) Filed: Jul. 7, 2022

(65) Prior Publication Data

US 2023/0008073 A1    Jan. 12, 2023

(30) Foreign Application Priority Data

Jul. 8, 2021   (JP) ................................. 2021-113654

(51) Int. Cl.
  *G09G 3/36*   (2006.01)
  *G02F 1/1333*   (2006.01)

(52) U.S. Cl.
  CPC ......... *G09G 3/3688* (2013.01); *G09G 3/3614* (2013.01); *G02F 1/133305* (2013.01); *G09G 2300/0426* (2013.01)

(58) Field of Classification Search
  CPC .......... G09G 3/3688; G09G 2300/0426; G02F 1/1333; G02F 1/133305
  See application file for complete search history.

(56) References Cited

U.S. PATENT DOCUMENTS

| 5,192,945 A | * | 3/1993 | Kusada ................ G09G 3/3611 345/100 |
| 2009/0096944 A1 | | 4/2009 | Ono |
| 2016/0267831 A1 | * | 9/2016 | Seo ...................... G09G 3/2085 |

FOREIGN PATENT DOCUMENTS

| CN | 107424581 A | * 12/2017 | ........... G09G 3/3674 |
| JP | 2009-98336 A | 5/2009 | |

* cited by examiner

*Primary Examiner* — Nelson M Rosario
*Assistant Examiner* — Scott D Au
(74) *Attorney, Agent, or Firm* — XSENSUS LLP

(57) ABSTRACT

According to one embodiment, a display device comprises a display panel, first and second driver chips. The display panel includes first and second edge portions, a display area between the first and second edge portions in a first direction, first signal lines extending to the display area, and second signal lines extending to the display area. The first driver chip is connected to the first edge portion to supply video signals to the first signal lines. The second driver chip is connected to the second edge portion to supply video signals to the second signal lines. Number N of the first signal lines and number M of the second signal lines are alternately arranged in a second direction.

12 Claims, 6 Drawing Sheets

DISPLAY DEVICE

CROSS-REFERENCE TO RELATED APPLICATIONS

This application is based upon and claims the benefit of priority from Japanese Patent Application No. 2021-113654, filed Jul. 8, 2021, the entire contents of which are incorporated herein by reference.

FIELD

Embodiments described herein relate generally to a display device.

BACKGROUND

A display device such as a liquid crystal display device comprises a display panel including a number of pixels and a driver chip that supplies video signals to each pixel. For example, the driver chip is mounted on a flexible circuit board connected to an edge portion of the display panel. The driver chip may also be mounted directly on the edge portion of the display panel.

As the resolution of the display panel is higher, the number of driver chips required to drive the display panel increases. However, if it is difficult to secure space for arrangement of a large number of driver chips, the higher resolution of the display panel is hindered.

DETAILED DESCRIPTION

Figure 1:
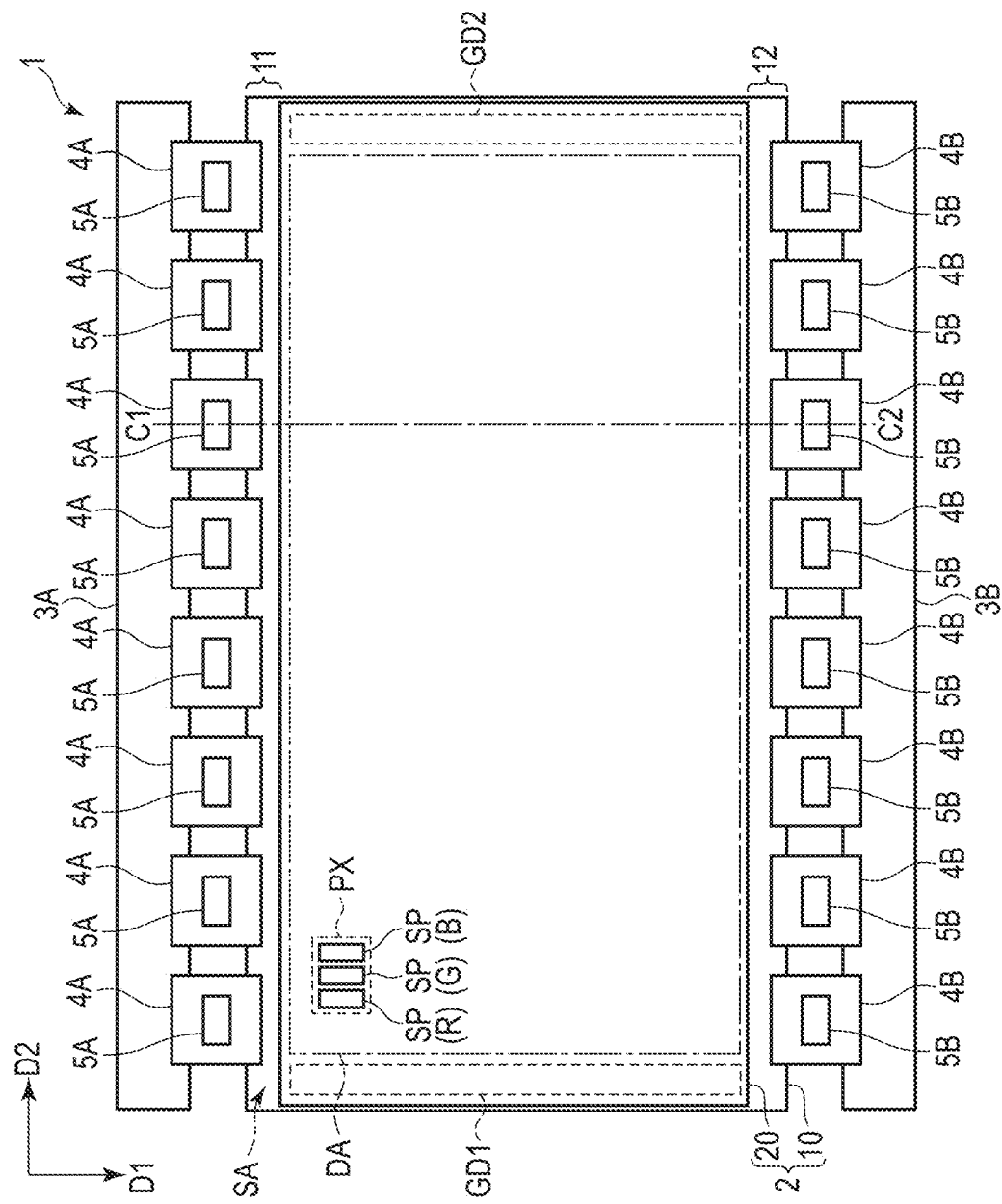
FIG. 1 is a plan view schematically showing a display device according to a first embodiment.

In general, according to one embodiment, a display device comprises a display panel, a first driver chip, and a second driver chip. The display panel includes a first edge portion, a second edge portion, a display area located between the first edge portion and the second edge portion in a first direction, a plurality of first signal lines extending to the display area, and a plurality of second signal lines extending to the display area. The first driver chip is connected to the first edge portion to supply video signals to the plurality of first signal lines. The second driver chip is connected to the second edge portion to supply video signals to the plurality of second signal lines. Furthermore, number N of the first signal lines and number M of the second signal lines are alternately arranged in a second direction intersecting the first direction.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings may be more schematic than in the actual modes, but they are mere examples, and do not limit the interpretation of the present invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In each of the embodiments, a liquid crystal display device will be disclosed as an example of the display device. However, each of the embodiments does not prevent application of individual technical ideas disclosed in the embodiment to other types of display devices.

For example, at least some of configurations disclosed in each of the embodiments are also applicable to a display device equipped with an organic electroluminescent element, a display device equipped with an LED element, an electronic paper-type display device including an electrophoretic element, a micro-electromechanical systems (MEMS)-applied display device, an electrochromism-applied display device, or the like.

First Embodiment

FIG. 1 is a plan view schematically showing a display device 1 according to a first embodiment. The display device 1 is a liquid crystal display device. The display device 1 can be used in, for example, various devices such as medical display devices used to display diagnostic images, and the like, personal computers, TV receivers, in-vehicle devices, smartphones, tablet terminals, cell phone terminals, game consoles, and wearable terminals.

The display device 1 comprises a display panel 2. In the example of FIG. 1, the display panel 2 has a rectangular shape having short sides along a first direction D1 and long sides along a second direction D2 orthogonal to the first direction D1. However, the shape of the display panel 2 is not limited to this example.

The display panel 2 comprises a first substrate 10 and a second substrate 20 which overlaps the first substrate 10. A width of the second substrate 20 in the first direction D1 is smaller than a width of the first substrate 10 in the first direction D1.

The first substrate 10 includes a first edge portion 11 and a second edge portion 12. In this embodiment, the first edge portion 11 and the second edge portion 12 correspond to an area which does not overlap the second substrate 20, of a surface of the first substrate 10. In other words, the first edge portion 11 is located between one of the long sides of the first substrate 10 in the first direction D1 and a long side of the second edge portion 12 which is close to the long side of the first substrate 10. The second edge portion 12 is located between the other long side of the first substrate 10 in the first direction D1 and a long side of the second edge portion 12 which is close to this long side of the first substrate 10. Both the first edge portion 11 and the second edge portion 12 have a shape elongated along the second direction D2.

The display panel 2 has a display area DA where images are displayed, and a peripheral area SA around the display area DA. The display area DA is located between the first edge portion 11 and the second edge portion 12 in the first direction D1. The peripheral area SA is shaped in a picture frame surrounding the display area DA. The first edge portion 11 and the second edge portion 12 are included in the peripheral area SA.

In the display area DA, a number of pixels PX arranged in the first direction D1 and the second direction D2 are disposed. The pixel PX is composed of red (R), green (G) and blue (B) sub-pixels SP. However, the pixel PX may include, for example, a sub-pixel SP of a color other than red, green, and blue, such as white, or may include a plurality of sub-pixels SP of the same color.

The display panel 2 further includes a first scan driver GD1 and a second scan driver GD2. Both the first scan driver GD1 and the second scan driver GD2 are formed on the first substrate 10 in the peripheral area SA. The display area DA is located between the first scan driver GD1 and the second scan driver GD2 in the second direction D2.

The display device 1 further comprises a first rigid substrate 3A, a second rigid substrate 3B, a plurality of first flexible substrates 4A, a plurality of second flexible substrates 4B, a plurality of first driver chips 5A, and a plurality of second driver chips 5B.

In the example shown in FIG. 1, the number of each of the first flexible substrates 4A, the second flexible substrates 4B, the first driver chips 5A, and the second driver chips 5B is eight, but is not limited to this example.

For example, the first rigid substrate 3A and the second rigid substrate 3B are printed circuit boards (PCBs) in which wires and circuits are formed and various electronic components are mounted on a rigid base material. For example, the first flexible substrate 4A and the second flexible substrate 4B are flexible printed circuit (FPC) boards in which wires and circuits are formed on a flexible substrate. The first rigid substrate 3A and the second rigid substrate 3B have higher rigidity than the first flexible substrate 4A and the second flexible substrate 4B.

Both the first rigid substrate 3A and the second rigid substrate 3B have a shape elongated in the second direction D2. The first rigid substrate 3A is disposed along the first edge portion 11. The second rigid substrate 3B is disposed along the second edge portion 12.

The plurality of first flexible substrates 4A are spaced apart and aligned in the second direction D2. One end of each of the first flexible substrates 4A is connected to the first edge portion 11 and the other end is connected to the first rigid substrate 3A.

The plurality of second flexible substrates 4B are spaced apart and aligned in the second direction D2. One end of each of the second flexible substrates 4B is connected to the second edge portion 12 and the other end is connected to the second rigid substrate 3B.

The plurality of first driver chips 5A are aligned in the second direction D2. Similarly, the plurality of second driver chips 5B are aligned in the second direction D2. The first driver chips 5A are mounted one by one on the first flexible substrate 4A and connected to the first edge portion 11 via the first flexible substrates 4A. The second driver chips 5B are mounted one by one on the second flexible substrates 4B and connected to the second edge portion 12 via the second flexible substrates 4B. In other words, the first flexible substrates 4A and the first driver chips 5A constitute a chip on film or chip on flexible (COF). Similarly, the second flexible substrates 4B and the second driver chips 5B constitute a COF.

In the example in FIG. 1, the positions of the first flexible substrates 4A and the second flexible substrates 4B in the second direction D2 correspond to each other. More specifically, a center line C1 of the first flexible substrate 4A and a center line C2 of the second flexible substrate 4B correspond to each other as illustrated for the third first flexible substrate 4A and the second flexible substrate 4B from the right. Similarly, a center of the first driver chip 5A and a center of the second driver chip 5B correspond to each other. However, the centers of the first flexible substrate 4A and the second flexible substrate 4B, and the centers of the first driver chip 5A and the second driver chip 5B do not necessarily have to correspond to each other.

Figure 2:
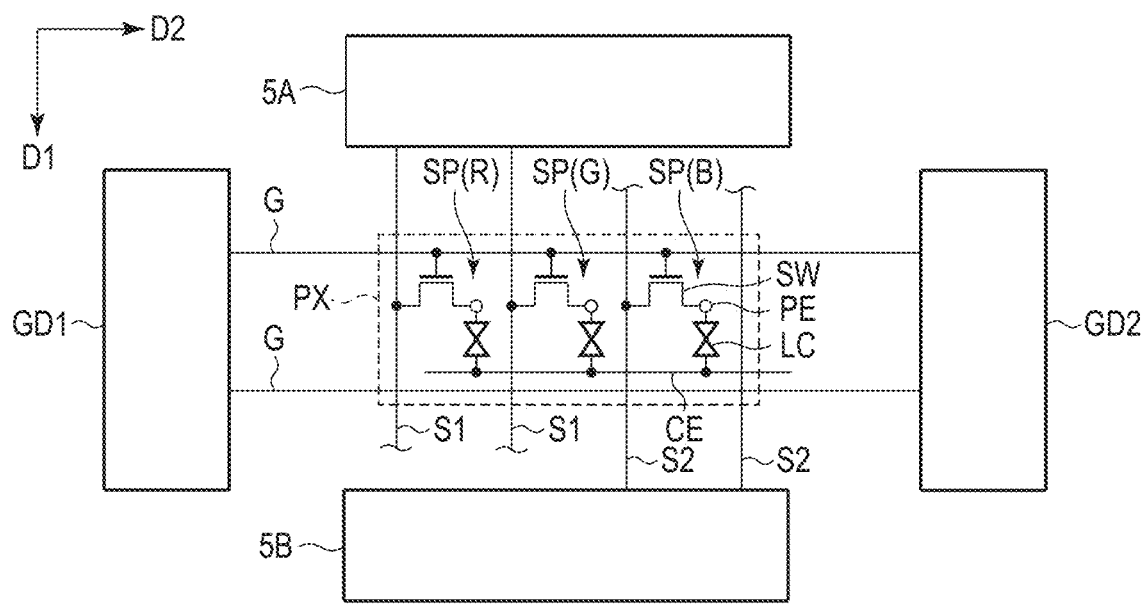
FIG. 2 is a view showing an example of a drive circuit of the display device according to the first embodiment.

FIG. 2 is a view showing an example of a drive circuit of the display device 1. A configuration corresponding to one pixel PX is schematically represented in this figure. A plurality of scanning lines G are connected to each of the first scan driver GD1 and the second scan driver GD2. The scanning lines G extend in the first direction X and are arranged in the second direction Y. The first scan driver GD1 and the second scan driver GD2 supply scanning signals to each of the scanning lines G.

A plurality of first signal lines S1 are connected to the first driver chip 5A. A plurality of second signal lines S2 are connected to the second driver chips 5B. The signal lines S1 and S2 extend in the first direction D1 and are arranged in the second direction D2. The first driver chip 5A supplies video signals to each of the first signal lines S1. The second driver chips 5B supplies video signals to each of the second signal lines S2.

A switching element SW, which is a thin-film transistor (TFT), and a pixel electrode PE connected to the switching element SW are disposed in each of the sub-pixels SP. The switching element SW is also connected to either the first signal line S1 or the second signal line S2, and the scanning lines G.

When a scanning signal is supplied to the scanning line G connected to the switching element SW, the video signal supplied to the first signal line S1 or the second signal line S2 connected to the switching element SW is applied to the pixel electrode PE connected to the switching element SW. At this time, an electric field is formed between the pixel electrode PE and the common electrode CE, and this electric field acts on the liquid crystal layer LC disposed between the first substrate 10 and the second substrate 20. For example, the common electrode CE is formed over a plurality of sub-pixels SP.

In this configuration, the scanning line G, the first signal line S1, the second signal line S2, the switching element SW, and pixel electrode PE are formed on the first substrate 10. The common electrode CE may be formed on the first substrate 10 or the second substrate 20. A color filter corresponding to the color of each sub-pixel SP is also formed on either of the first substrate 10 and the second substrate 20.

In the example in FIG. 2, the switching elements SW of the red (R) and green (G) sub-pixels SP are connected to the first signal lines S1, and the switching element SW of the blue (B) sub-pixel SP is connected to the second signal line S2. In other pixels PX, too, some of three sub-pixels SP are connected to the first signal lines S1, and the rest is connected to the second signal line S2.

Figure 3:
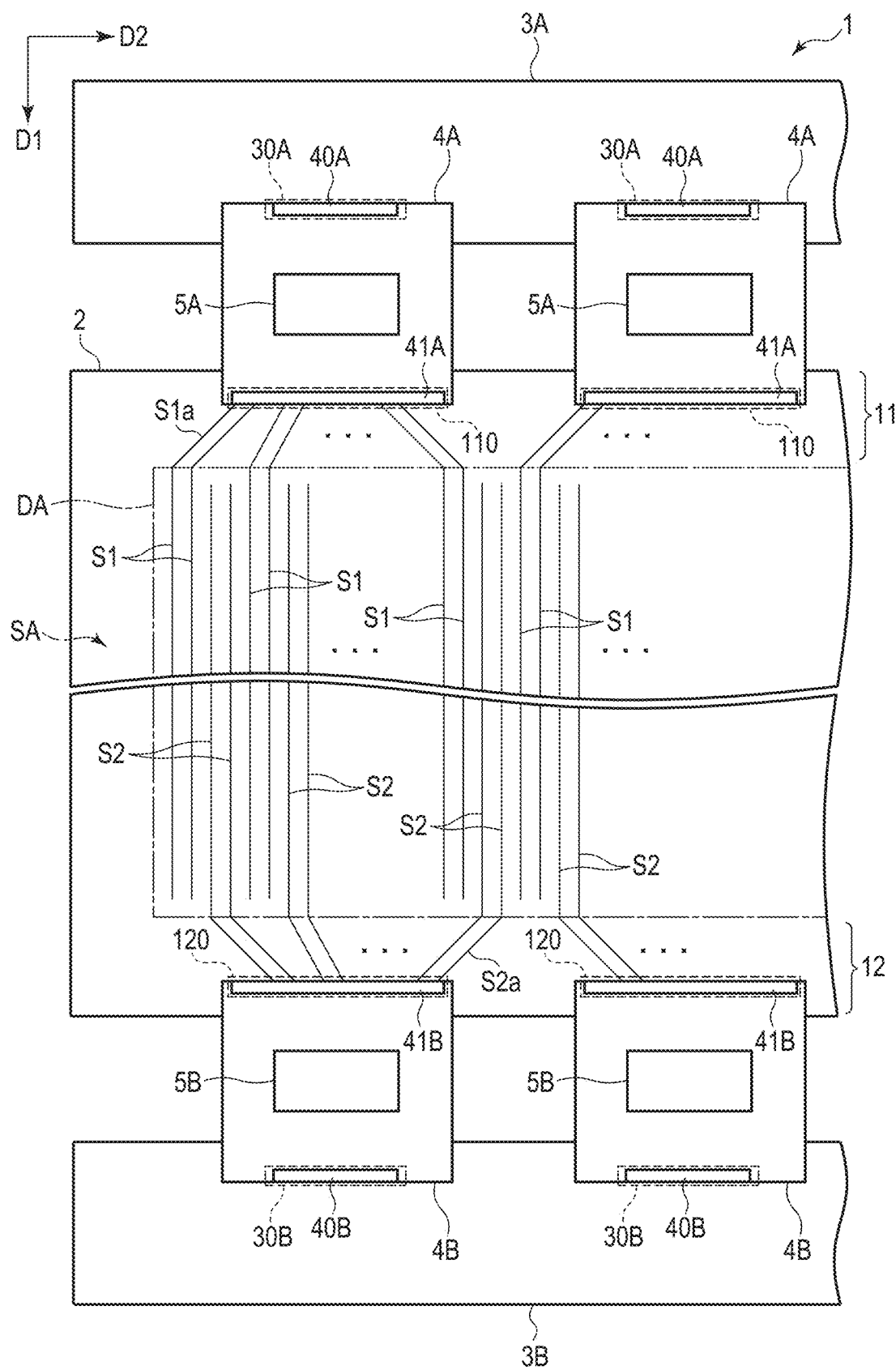
FIG. 3 is an enlarged plan view showing a part of the display device according to the first embodiment.

FIG. 3 is an enlarged plan view showing a portion of the display device 1. In this figure, the display panel 2, the first rigid substrate 3A, the second rigid substrate 3B, the first flexible substrate 4A, the second flexible substrate 4B, the first driver chip 5A, the second driver chip 5B, the first signal lines S1, and the second signal lines S2 are schematically illustrated.

The first flexible substrate 4A includes terminal portions 40A and 41A. The terminal portion 40A is connected to a terminal portion 30A provided on the first rigid substrate 3A. The terminal portion 41A is connected to a terminal portion 110 provided at the first edge portion 11. Each of the first signal lines S1 is connected to the terminal portion 110 and extends from one end to the other end of the display area DA in the first direction D1.

Similarly, the second flexible substrate 4B includes terminal portions 40B and 41B, the terminal portion 40B is connected to a terminal portion 30B provided on the second rigid substrate 3B, and the terminal portion 41B is connected to a terminal portion 120 provided at the second edge portion 12. Each of the second signal lines S2 is connected to the terminal portion 120 and extends from one end to the other end of the display area DA in the first direction D1.

In the display area DA, N first signal lines S1 and M second signal lines N are alternately arranged in the second direction D2. N and M are integers. For example, N and M are different from the number (three in this embodiment) of a plurality of sub-pixels SP constituting one pixel PX. In this embodiment, each of N and M is two. An interval between two adjacent first signal lines S1, an interval between two adjacent second signal lines S2, and an interval between the adjacent first signal line S1 and second signal line S2 are all the same.

A width of the terminal portion 110 in the second direction D2 is smaller than a spreading width in the display area DA, of the plurality of first signal lines S1 connected to the terminal portion 110. At least some of the first signal lines S1 include inclined portions S1a extending in a direction intersecting the first direction D1 at the first edge portion 11.

Similarly, a width of the terminal portion 120 in the second direction D2 is smaller than a spreading width in the display area DA, of the plurality of second signal lines S2 connected to the terminal portion 120. At least some of the second signal lines S2 include inclined portions S2a extending in a direction intersecting the first direction D1 at the second edge portion 12.

For example, the number of first signal lines S1 connected to one terminal portion 110 is 700 or more. Similarly, the number of second signal lines S2 connected to one terminal portion 120 is 700 or more. Of the plurality of terminal portions 110 and 120, wires for supplying drive signals to the scanning drivers GD1 and GD2 are also connected to the terminal portions 110 and 120 disposed at both ends in the second direction D2. Such drive signals are supplied from the first rigid substrate 3A and the second rigid substrate 3B to the first flexible substrate 4A and the second flexible substrate 4B.

Figure 4:
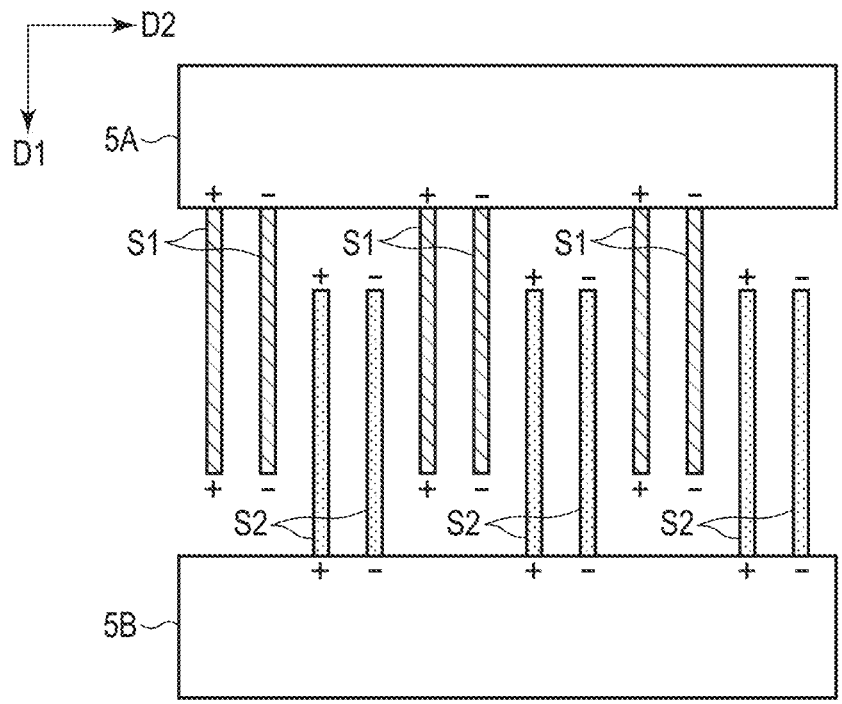
FIG. 4 is a view showing an example of a method of driving the display device according to the first embodiment.

FIG. 4 is a view showing an example of a method of driving the display device 1. In the illustrated example, the first driver chip 5A supplies video signals having positive (+) and negative (−) polarities, alternately, one by one, to the plurality of first signal lines S1 arranged in the second direction D2. In addition, the second driver chips 5B supplies video signals having positive (+) and negative (−) polarities, alternately, one by one, to the plurality of second signal lines S2 arranged in the second direction D2. Thus, a dot-inversion drive scheme in which polarities of the adjacent signal lines among the entire signal lines (S1 and S2) arranged in the second direction D2 in the display area DA are different is realized.

The polarity of the video signal supplied to each of the first signal lines S1 and the second signal lines S2 may be inverted for each frame. In other words, in one frame, video signals having the polarities as shown in FIG. 4 may be supplied and, in the following frame, the first signal lines S1 and the second signal lines S2 supplied with the video signals having the positive polarity in FIG. 4 may be supplied with the video signals having the negative polarity, and the first signal lines S1 and the second signal lines S2 supplied with the video signals having the negative polarity in FIG. 4 may be supplied with the video signals having the positive polarity.

In the above-described embodiment, the first driver chip 5A is connected to the first edge portion 11 of the display panel 2, and the second driver chip 5B is connected to the second edge portion 12. Furthermore, N first signal lines S1 connected to the first driver chip 5A and M second signal lines S2 connected to the second driver chip 5B are alternately arranged in the display area DA.

According to this configuration, arrangement space for the driver chips and the flexible substrates can easily be secured as compared with a case where all the driver chips and the flexible boards that supply the video signals to the signal lines are connected to either of the first edge portion 11 and the second edge portion 12. As a result, the signal lines S1 and S2 can be arranged with narrow pitches in the display area DA, and a high-definition display device 1 can be realized.

If the area driven by the first driver chip 5A and the area driven by the second driver chip 5B are clearly separated in the display area DA, a boundary line between these areas may be visibly recognized and the display quality may be degraded. In contrast, in this embodiment, since N first signal lines S1 and M second signal lines S2 are arranged alternately, occurrence of the above boundary line can be suppressed.

Figure 5:
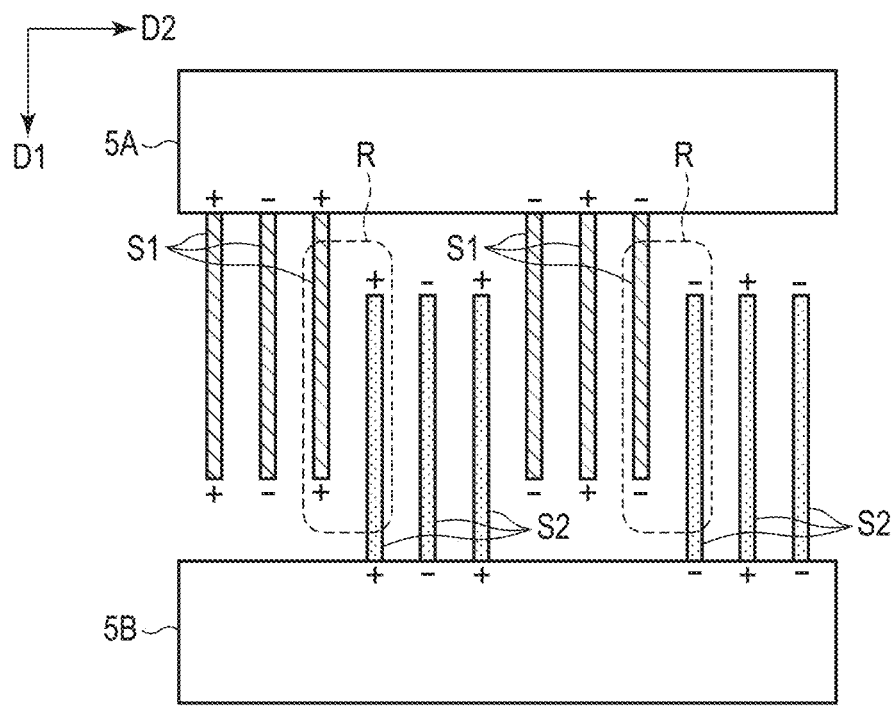
FIG. 5 is a view showing a comparative example of the first embodiment.

FIG. 5 is a view showing a comparative example of this embodiment. In this figure, the first driver chip 5A, the second driver chip 5B, the first signal lines S1, and the second signal lines S2 are illustrated similarly to FIG. 4. However, three first signal lines S1 and three second signal lines S2 are arranged alternately. In other words, each of N and M is 3 in this comparative example.

In this configuration, when the polarities of the video signals supplied to the first signal lines S1 by the first driver chip 5A are inverted one by one and when the polarities of the video signals supplied to the second signal lines S2 by the second driver chips 5B are inverted one by one, an area R where the first signal lines S1 and the second signal lines S2 having the same polarity are arranged can occur periodically. Such an area R may be visually recognized as a streak extending in the first direction D1.

In contrast, if each of N and M is two, similarly to this embodiment, the area where the first signal lines S1 and second signal lines S2 having the same polarity are continuous does not occur in the display area DA as shown in FIG. 4. Therefore, streaks caused by such areas are not visibly recognized and the display quality can be improved.

N and M do not necessarily have to be two. Even if N and M are even numbers other than two, occurrence of the area where the first signal lines S1 and second signal lines S2 having the same polarity are contiguous can be suppressed.

If N and M are the same similarly to this embodiment, the wiring patterns of the first edge portion 11 and the second edge 12, and the like becomes substantially symmetrical and the design of the display device 1 is thereby facilitated. However, N and M do not necessarily have to be the same number from the viewpoint of suppressing the occurrence of the area where the first signal lines S1 and second signal lines S2 having the same polarity are contiguous.

In addition to the above, various suitable advantages can be obtained from this embodiment.

Second Embodiment

A second embodiment will be described. Constituent elements that are the same as or similar to those of the first embodiment are denoted by the same reference symbols, and their description is omitted as appropriate.

Figure 6:
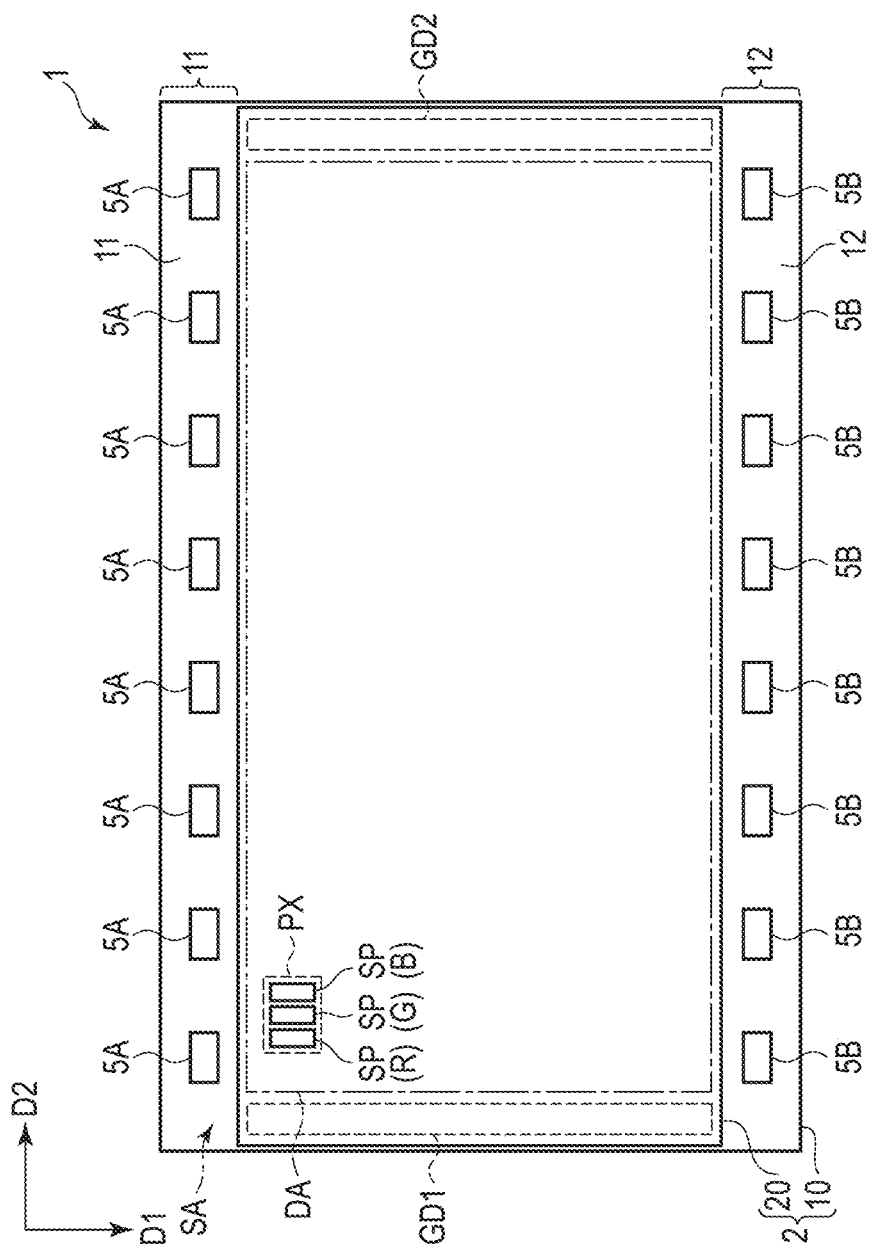
FIG. 6 is a plan view schematically showing a display device according to a second embodiment.

FIG. 6 is a plan view schematically showing a display device 1 according to the second embodiment. In this embodiment, each first driver chip 5A is directly mounted on a first edge portion 11 and each second driver chip 5B is mounted directly on a second edge portion 12. In other words, for example, when a base material of a first substrate 10 is formed of glass, each first driver chip 5A and each second driver chip 5B constitutes a chip on glass (COG).

The first driver chips 5A are spaced apart and arranged with regular intervals in a second direction D2. The second driver chips 5B are spaced apart and arranged with regular intervals in a second direction D2. In the example of FIG. 6, positions of the first driver chips 5A and the second driver chips 5B in the second direction D2 correspond, but are not limited to this example.

The display device 1 may comprise a first rigid substrate 3A, a second rigid substrate 3B, a first flexible substrate 4A, and a second flexible substrate 4B similarly to the first embodiment.

Figure 7:
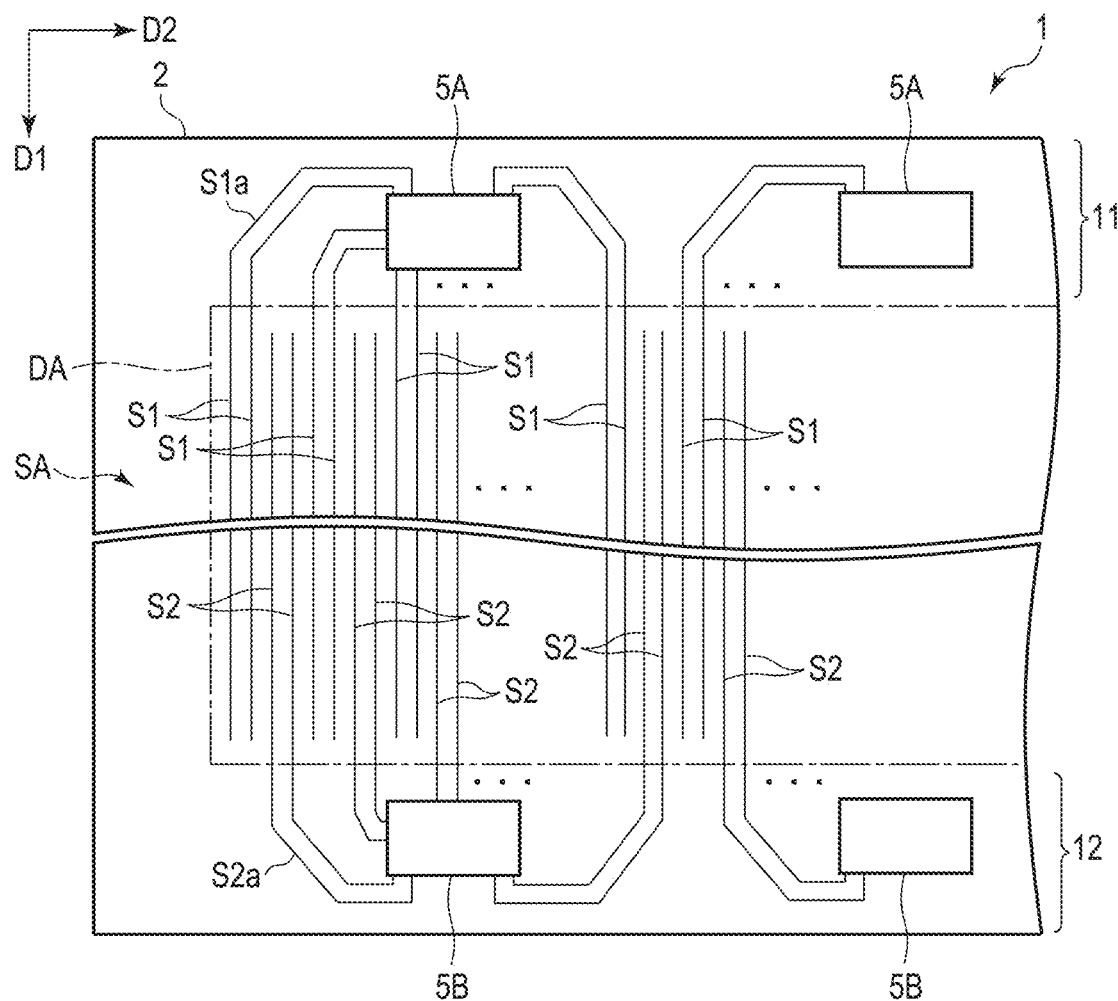
FIG. 7 is an enlarged plan view showing a part of the display device according to the second embodiment.

FIG. 7 is an enlarged plan view showing a part of the display device 1 according to this embodiment. In this figure, a display panel 2, a first driver chip 5A, a second driver chip 5B, first signal lines S1, and second signal lines S2 are schematically illustrated.

In the display area DA, N first signal lines S1 and M second signal lines N are alternately arranged in the second direction D2. N and M are integers, both of which are two in the example in FIG. 7. An interval between two adjacent first signal lines S1, an interval between two adjacent second signal lines S2, and an interval between the adjacent first signal line S1 and second signal line S2 are all the same.

In this embodiment, N and M do not necessarily have to be two, but N and M are desirably even numbers when the driving method described above with reference to FIG. 4 is applied.

The first signal lines S1 are connected to the first driver chip 5A at the first edge portion 11. The second signal lines S2 are connected to the second driver chip 5B at the second edge portion 12.

In the example of FIG. 7, the first signal lines S1 are connected to not only a side opposed to the display area DA, but also the other sides among four sides of the first driver chip 5A. Similarly, the second signal lines S2 are connected to not only a side opposed to the display area DA, but also the other sides among four sides of the second driver chips 5B.

Even in the configuration of this embodiment, arrangement space for the driver chips can easily be secured as compared with a case where all the driver chips that supply the video signals to the signal lines are arranged at either of the first edge portion 11 and the second edge portion 12. As a result, the signal lines S1 and S2 can be arranged with narrow pitches in the display area DA, and a high-definition display device 1 can be realized.

In addition, the same advantages as those of the first embodiment can be obtained from this embodiment.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
   a display panel including a first edge portion, a second edge portion, a display area located between the first edge portion and the second edge portion in a first direction, a plurality of first signal lines extending to the display area, and a plurality of second signal lines extending to the display area;
   a first driver chip connected to the first edge portion to supply video signals to the plurality of first signal lines; and
   a second driver chip connected to the second edge portion to supply video signals to the plurality of second signal lines, wherein
   number N of the first signal lines and number M of the second signal lines are alternately arranged in a second direction intersecting the first direction,
   the first driver chip supplies video signals having polarities alternately different one by one to the plurality of first signal lines arranged in the second direction, and
   the second driver chip supplies video signals having polarities alternately different one by one to the plurality of second signal lines arranged in the second direction.

2. The display device of claim 1, wherein each of the N and the M is an even number.

3. The display device of claim 2, wherein each of the N and the M is two.

4. The display device of claim 1, further comprising:
   a plurality of first driver chips including the first driver chip, which are arranged in the second direction; and
   a plurality of second driver chips including the second driver chip, which are arranged in the second direction.

5. The display device of claim 4, further comprising:
   a plurality of first flexible substrates connected to the first edge portion; and
   a plurality of second flexible substrates connected to the second edge portion,
   wherein
   the plurality of first driver chips are mounted on the plurality of first flexible substrates, respectively, and
   the plurality of second driver chips are mounted on the plurality of second flexible substrates, respectively.

6. The display device of claim 5, wherein
   the plurality of first flexible substrates are spaced apart and arranged in the second direction, and the plurality of second flexible substrates are spaced apart and arranged in the second direction.

7. The display device of claim 6, wherein
the plurality of first flexible substrates are connected to a first rigid substrate elongated in the second direction, and
the plurality of second flexible substrates are connected to a second rigid substrate elongated in the second direction.

8. The display device of claim 4, wherein
the plurality of first driver chips are mounted on the first edge portion, and
the plurality of second driver chips are mounted on the second edge portion.

9. The display device of claim 1, wherein
the display area includes a plurality of pixels, and
each of the plurality of pixels includes number, different from the N and the M, of sub-pixels.

10. The display device of claim 9, wherein
at least one of the sub-pixels constituting one pixel is connected to one of the plurality of first signal lines, and rest of the sub-pixels is connected to one of the plurality of second signal lines.

11. The display device of claim 1, wherein
at least one of the plurality of first signal lines includes a first inclined portion extending in a direction intersecting the first direction at the first edge portion, and
at least one of the plurality of second signal lines includes a second inclined portion extending in a direction intersecting the first direction at the second edge portion.

12. The display device of claim 1, further comprising:
a first substrate; and
a second substrate overlapping the first substrate,
wherein
a width of the second substrate in the first direction is smaller than a width of the first substrate in the first direction, and
the first edge portion and the second edge portion correspond to areas of a surface of the first substrate, the areas do not overlap the second substrate.

* * * * *